United States Patent
Itoh

(10) Patent No.: US 7,137,017 B2
(45) Date of Patent: Nov. 14, 2006

(54) METHOD AND APPARATUS FOR CONTROLLING PROCESSOR OPERATION SPEED

(75) Inventor: Hiroshi Itoh, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 10/472,304

(22) PCT Filed: Apr. 24, 2002

(86) PCT No.: PCT/JP02/04106

§ 371 (c)(1),
(2), (4) Date: Sep. 17, 2003

(87) PCT Pub. No.: WO02/088913

PCT Pub. Date: Nov. 7, 2002

(65) Prior Publication Data

US 2004/0073825 A1    Apr. 15, 2004

(30) Foreign Application Priority Data

Apr. 27, 2001    (JP) ............................. 2001-130841

(51) Int. Cl.
*G06F 1/04*    (2006.01)
(52) U.S. Cl. ....................... 713/322; 713/300
(58) Field of Classification Search ................ 713/322, 713/300
See application file for complete search history.

(56) References Cited

U.S. PATENT DOCUMENTS 5,561,802 A * 10/1996 Orimo et al. ................ 717/136

FOREIGN PATENT DOCUMENTS

| JP | 55-99650 A | 7/1980 |
|---|---|---|
| JP | PUPA 55-99650 | 7/1980 |
| JP | 58-41479 A | 3/1983 |
| JP | 61-253559 A | 11/1986 |
| JP | 1-155437 A | 6/1989 |
| JP | 2-5133 A | 1/1990 |

(Continued)

OTHER PUBLICATIONS

PCT/JP02/04106, International Search Report, Aug. 6, 2002, JPO.

*Primary Examiner*—Lynne H. Browne
*Assistant Examiner*—Tse Chen
(74) *Attorney, Agent, or Firm*—Mark E. McBurney

(57) ABSTRACT

The present invention registers execution modules in association with operating speed attribute data by analyzing code containing operating speed of each of the execution modules as attribute data, groups the registered execution modules by operating speed based on the associated operating speed attribute data and creates a file header containing attributes of each group, upon loading an executable file containing said file header into memory at the time of execution; associates the operating speed attribute data with an address range of the loading for each execution module in the executable file, and controls the operating speed of the processor executing an execution module according to the operating speed attribute data associated with the address of the execution module when the module is executed.

8 Claims, 11 Drawing Sheets

FOREIGN PATENT DOCUMENTS

| | | |
|---|---|---|
| JP | 2-118811 A | 5/1990 |
| JP | 2-202609 A2 | 8/1990 |
| JP | PUPA 2-202609 | 8/1990 |
| JP | 3-55614 A | 3/1991 |
| JP | 3-257608 A | 11/1991 |
| JP | 4-251331 A | 9/1992 |
| JP | PUPA 4-343132 | 11/1992 |
| JP | 8-106383 A | 4/1996 |
| JP | 11-296252 A | 10/1999 |
| JP | PUPA 2002-169790 | 6/2002 |

* cited by examiner

```
#pragma(HIGH_SPEED, FunctionH)
#pragma(LOW_SPEED, FunctionL)

void FunctionH(arg1,arg2, ... )
{

} void FunctionL(arg1,arg2, ... )
{

```
#pragma(MID_SPEED, FunctionM)

void FunctionM(arg1,arg2, ... )
{
// NORMAL PROCESSING
    •
    •
    •
_asm {
    highclk     ; INSTRUCTION FOR SWITCHING TO HIGH SPEED CLOCK
}
// HIGH SPEED PROCESSING
    •
    •
    •
_asm {
    rstrclk     ; INSTRUCTION FOR SWITCHING BACK TO DEFAULT CLOCK
}
// NORMAL PROCESSING
    •
    •
    •
}
```

(B)

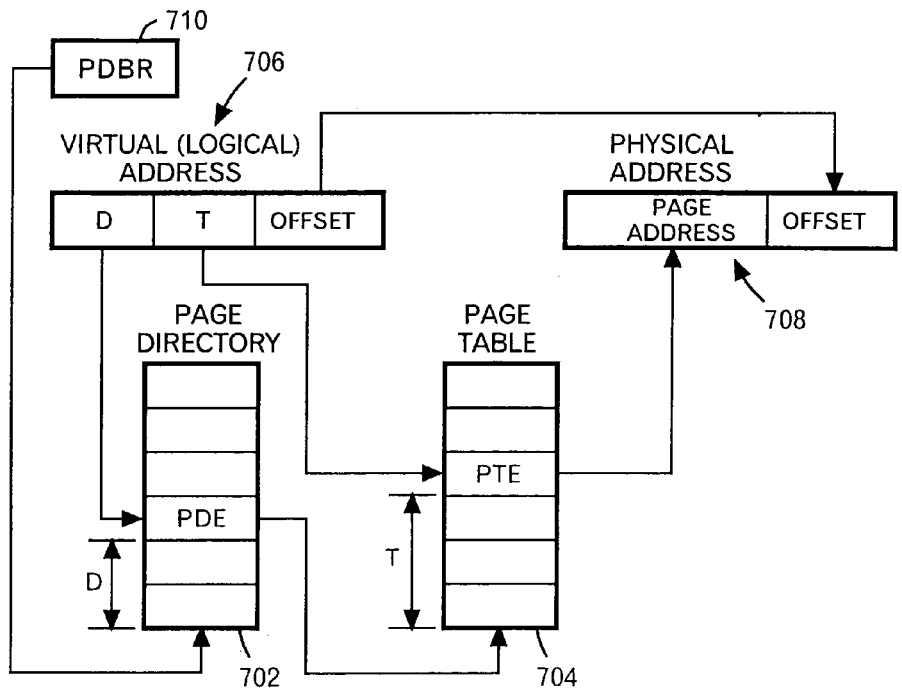
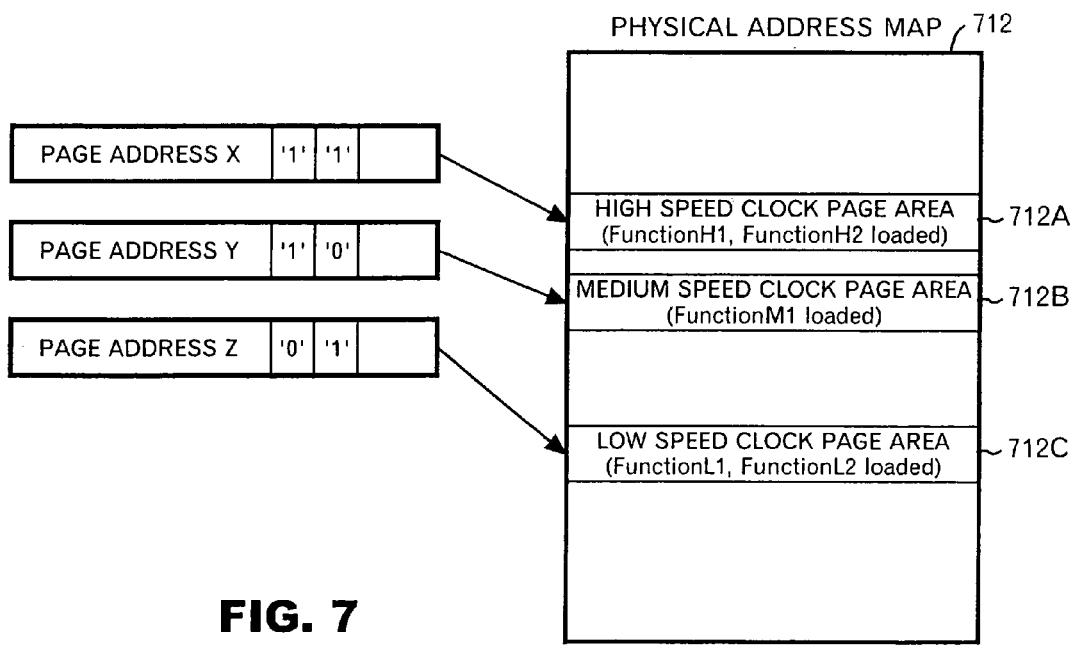
FIG. 7 ns# METHOD AND APPARATUS FOR CONTROLLING PROCESSOR OPERATION SPEED

BACKGROUND OF THE INVENTION

The present invention relates generally to a technique for reducing power consumption by a processor, and more particularly to such a technique for reducing power consumption by allowing clock speed of the processor to be varied.

Computers, particularly personal computers, have been widely used not only in enterprises but also in homes and schools. The performance of microprocessors used in the personal computers has been enhanced dramatically, and it is not unusual for the operating clock to exceed 1 GHz today. As the operating clock increases, however, both power consumption and heating increase, and a problem to be solved for high speed microprocessors is how to suppress such power consumption and heating. Notebook computers in particular are operated with battery power, and reducing power consumption is therefore even more important with notebook computers than with desktop computers.

In view of the above, some techniques have been proposed to vary a clock speed of a processor to reduce power consumption and heating in the processor. Such proposals are based on the understanding that not all programs need to run at the same clock speed. Japanese Patent Publication H8-76874, for example, teaches a CPU clock control device and method for which one or more performance information setting circuits for setting CPU performance information required for each task, a selection information generating circuit for determining the clock frequency of the CPU so that the CPU operates at the minimum performance level required by a task started, an oscillation circuit for generating a plurality of clock signals, and a clock selecting circuit for selecting one of the clock signals and providing it to the CPU. This clock control is aimed at operating the CPU with low power consumption even at the time of task execution in a multitasking environment depending on a program to be executed in the CPU, by switching automatically to the slowest CPU clock at which performance requirement of a program to be executed is satisfied to thereby reduce power consumption.

U.S. Pat. No. 6,138,232 (Japanese Patent Publication H10-228383) teaches a microprocessor and operating method therefor in which an interrupt from one of a plurality of interrupt sources is accepted to change from operating on a current task to operating on a priority task, and a rate of microprocessor instruction operation during operation in response to an interrupt is set depending upon the interrupt source producing the interrupt. According to this teaching, a rate table of interrupt source to instruction operation is provided, which is accessed upon receipt of an interrupt to obtain a rate of instruction operation corresponding to the interrupt source.

As seen from the above, the prior art has sought reduction of power consumption and heating by changing the operating speed (clock) of a processor depending on a task to be executed or a type of interrupt to be processed.

The conventional techniques change the clock speed based on a predetermined task or interrupt, which may not achieve optimum operation in the case where a task comprises a mixture of codes some of which require high speed operation while the other can run at a slower speed. In order to achieve the optimum operation aiming at the reduction of power consumption and heating, more sophisticated control, specifically based on an execution address and hence execution code of a program is required.

SUMMARY OF THE INVENTION

Therefore, a purpose of the present invention is to provide more sophisticated power management by controlling clock speed of a processor based on an execution address and hence execution code.

A further purpose for the invention is to allow operation clocks to be specified for a program upon producing the program in order to achieve the above power management.

According to a first aspect of the present invention, a method for controlling operating speed of a processor is provided which comprises the steps of registering execution modules in association with operating speed attribute data by analyzing code containing operating speed of each of the execution modules as attribute data, grouping the registered execution modules by operating speed based on the associated operating speed attribute data and creating a file header containing attributes of each group, upon loading an executable file containing the file header into memory at the time of execution, associating operating speed attribute data with an address range of the loading for each execution module in the executable file, and controlling the operating speed of the processor executing an execution module according to the operating speed attribute data associated with the address of the execution module when the module is executed.

According to a second aspect of the present invention, an apparatus for controlling operating speed of a processor is provided which comprises means for registering execution modules in association with operating speed attribute data by analyzing code containing operating speed of each of the execution modules as attribute data, means for grouping the registered execution modules by operating speed based on the associated operating speed attribute data, and creating a file header containing attributes of each group, means for, upon loading an executable file containing the file header into memory at the time of execution, associating operating speed attribute data with an address range of the loading for each execution module in the executable file, and means for controlling the operating speed of the processor executing an execution module according to the operating speed attribute data associated with the address of the execution module when the module is executed.

BRIEF DESCRIPTION of the DRAWINGS

Some of the purposes of the invention having been stated, others will appear as the description proceeds, when taken in connection with the accompanying drawings, in which:

FIG. 3 shows a portion of source code containing special descriptors for controlling the operating speed according to the present invention;

FIG. 7 is a block diagram showing an example of operating speed control using a virtual address conversion mechanism;

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
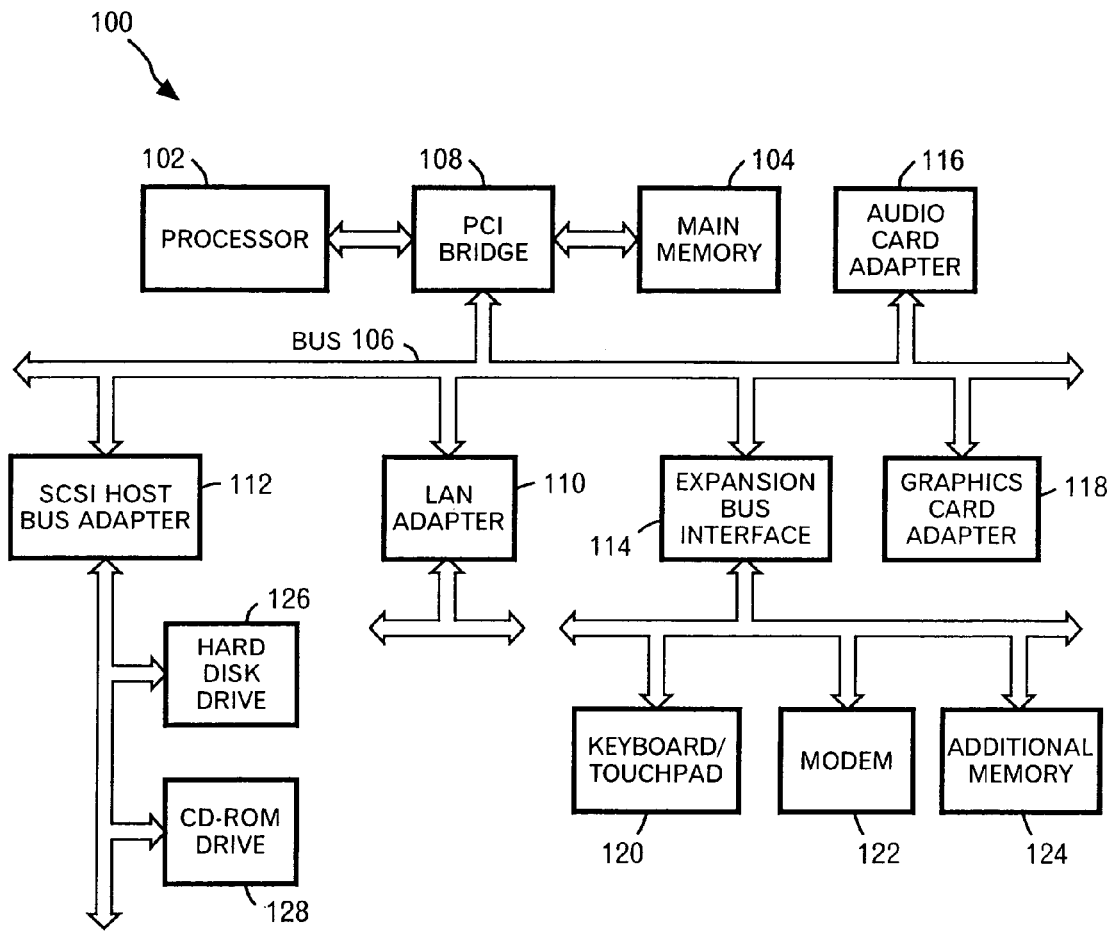
FIG. 1 is a block diagram showing an exemplary hardware configuration of a data processing system incorporating a processor whose operating speed is controlled according to the present invention.

Referring now more particularly to the accompanying drawings, FIG. 1 shows an exemplary hardware configuration of a data processing system incorporating a processor whose operating speed is controlled according to the present invention. While the data processing system 100 shown in FIG. 1 is assumed to be a personal computer of either notebook or desktop type, the present invention is not limited to such a personal computer and may be applied to any computer which requires reduction of power consumption.

In the data processing system 100 shown in FIG. 1, a processor 102 whose operating clock is controlled according to the present invention and main memory 104 are connected to a PCI bus 106 through a PCI bridge 108. The PCI bridge 108 may contain an integrated memory controller/cache memory for the processor 102. In addition to the PCI bridge 108, other components such as a LAN adapter 110, SCSI host bus adapter 112, expansion bus interface 114, audio card adapter 116, and graphics card adapter 118 can be connected to the PCI bus 106. The expansion bus interface 114 provides additional connection for a keyboard/touchpad 120, modem 122, and additional memory 124 while the SCSI host bus adapter 112 provides additional connection for a hard disk drive 126 and CD-ROM drive 128.

An operating system and application programs run by the processor 102 are stored, for example, in the hard disk drive 126, and read into the main memory 104 as needed.

Described next with reference to FIG. 2 to FIG. 12 is a technique for varying the clock speed of the processor 102 for each executable code of an application program according to the present invention when the application program is executed under the control of the operating system in a data processing system such as shown in FIG. 1.

Figure 2:
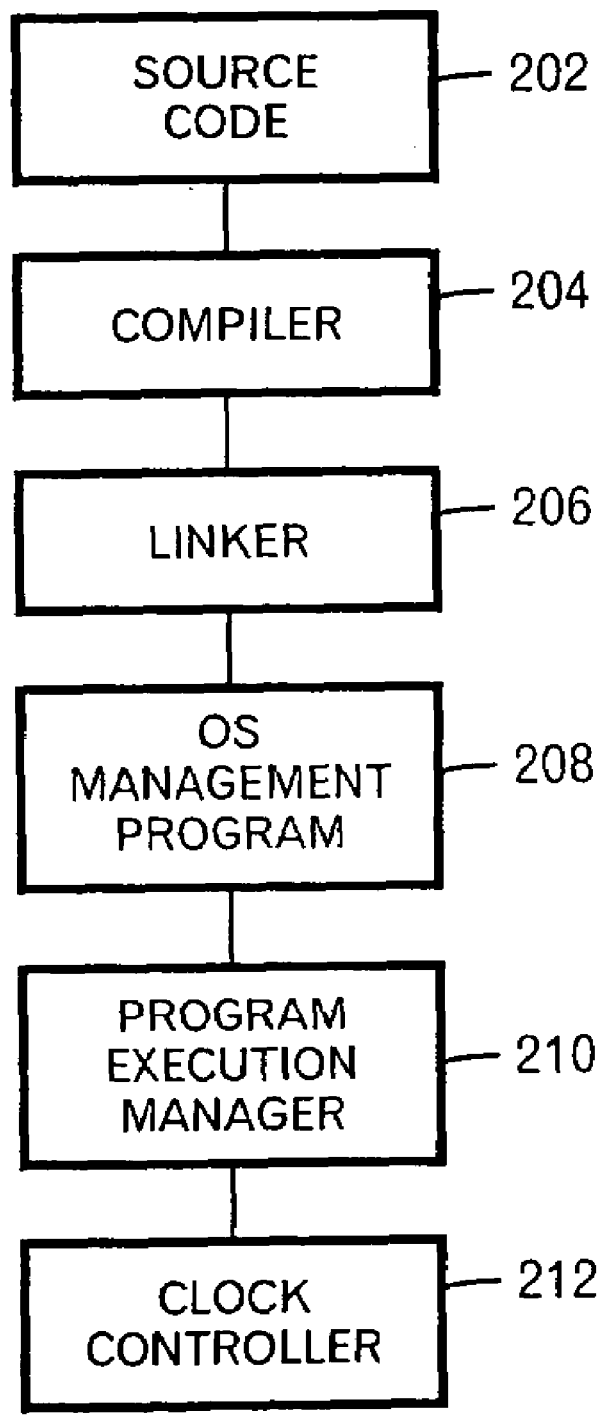
FIG. 2 is a block diagram showing the basic configuration of the present invention.

FIG. 2 shows the basic configuration of the present invention including a source code 202 which describes a program containing operating speeds of executable modules (functions) as attribute data, a compiler 204 which registers the executable modules in association with the operating speed attribute data by analyzing the source code 202, a linker 206 which groups the registered execution modules by operating speed based on the associated operating speed attribute data and creates a file header containing the attribute of each group, an OS management program 208 which, upon loading an executable file containing the file header into memory at the time of execution, stores corresponding operating speed attribute data in a predetermined operating speed data storage for each execution module in the executable file, a program execution manager 210 which reads corresponding operating speed data from the operating speed data storage when an execution module is executed, and a clock controller 212 which controls the operating speed of the processor 102 executing the execution module, based on the read operating speed data. The source code 202, compiler 204, and linker 206 may be implemented in either the data processing system 100 shown in FIG. 1 or a different data processing system (using a cross compiler if the processor architecture is different). The OS management program 208 may be implemented as part of the operating system running in the data processing system 100 shown in FIG. 1. The program execution manager 210 and clock controller 212 may be implemented as internal functions of the processor 102.

A portion of the source code 202 relating to the present invention is shown in FIG. 3. The source code 202 shown in FIG. 3 is written in C, but a different language may also be used. In FIG. 3, "#pragma" is a descriptor referred to as pragma directive which allows a programmer to define the attributes of the corresponding function. In FIG. 3(A), FunctionH( ) is defined as a function running at high speed (hereinafter referred to as "high speed function") which is loaded in an address area for high speed execution, and FunctionL( ) is defined as a function running at low speed (hereinafter referred to as "low speed function") which is loaded in an address area for low speed execution. As shown in FIG. 3(B), processor instructions for overriding the operating speed settings by the pragma directive may be used. In the example shown in FIG. 3 (B), FunctionM( ) defined as a function running at medium speed (hereinafter referred to as "medium speed function") is switched to a high speed clock by a processor instruction "highclk" during normal processing, and switched back to the original clock by another processor instruction "rstclk". These processor instructions can be executed by providing, for example, processor specific library functions.

With the pragma directive shown in FIG. 3, programmer's knowledge relating to the optimum operating clock for code can be reflected in object code for each of the execution modules therein. While each of the high, medium, and low speed operations is explicitly specified in FIG. 3, it is also possible to define a particular speed (e.g., high speed) as a default and explicitly specify only the other speeds (e.g., medium and low). Also, while the number of available speeds is three in the present embodiment, it may be two, i.e., high and low, or four or more.

Figure 4:
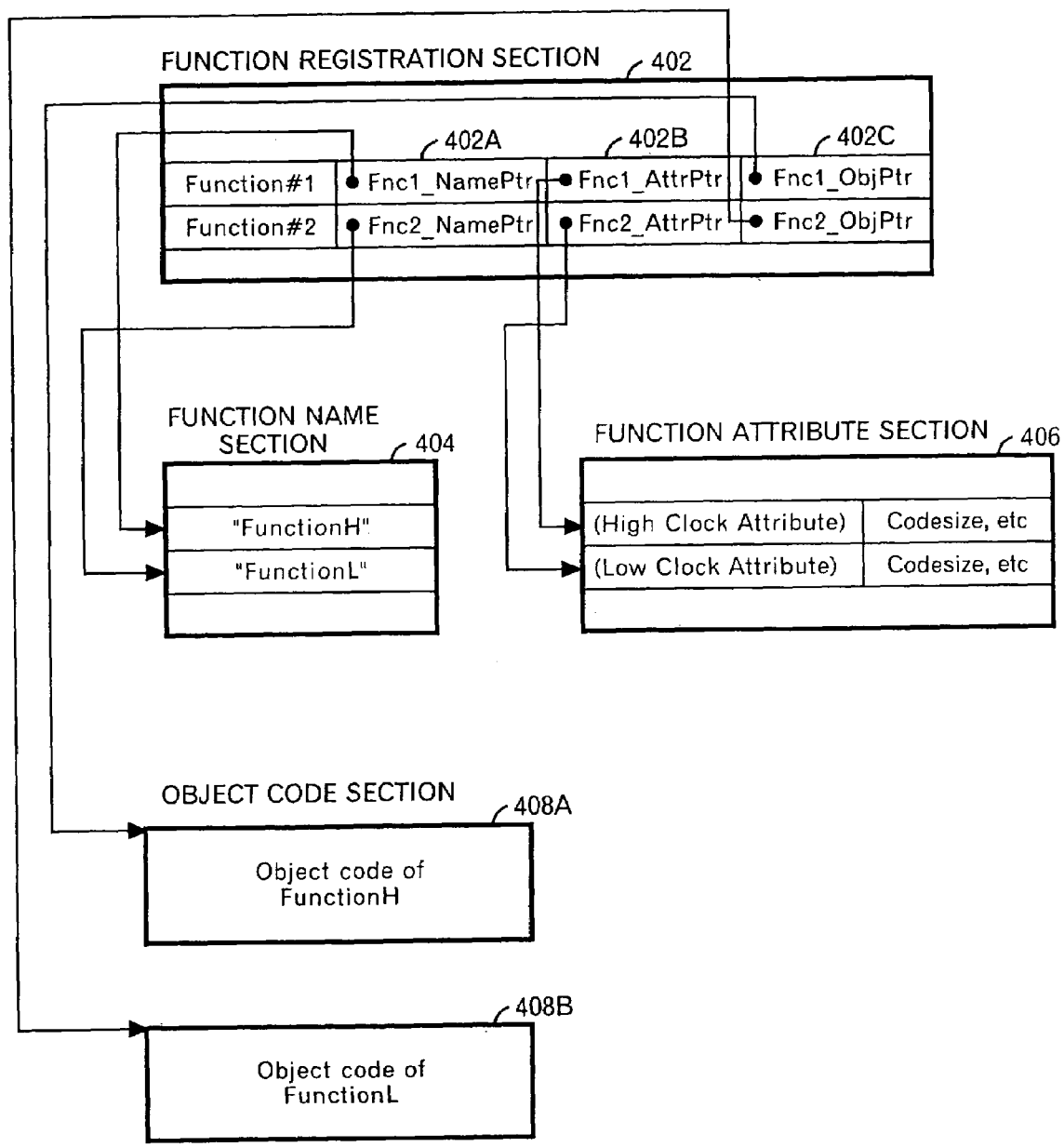
FIG. 4 shows a result of analyzing the source code shown in FIG. 3 by a compiler.
Figure 5:
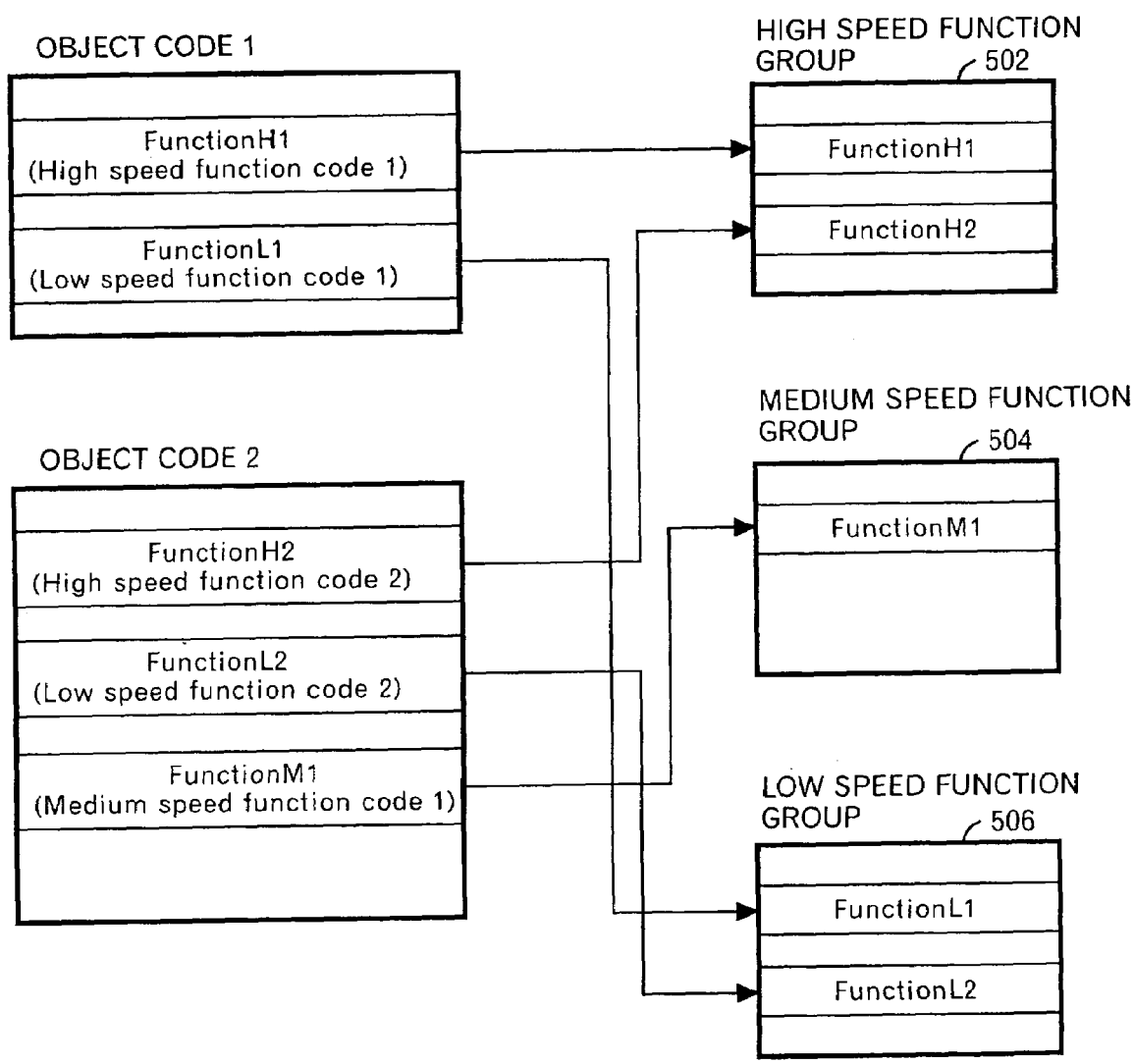
FIG. 5 shows how a linker rearranges object codes.

As shown in FIG. 4, the compiler 204 creates object code and a function registration table containing the operating speed data specified by the pragma directives as attribute data by analyzing the source code 202. It should be easy for one skilled in the art to allow the compiler 204 to analyze the pragma directives relating to the operating speed. The structure shown in FIG. 4 includes a function registration section 402 registering data for each function analyzed by the compiler 204, a function name section 404 registering the names of the registered functions, a function attribute section 406 registering attributes such as clock speed and code size of each function, and an object code section 408 containing the object code of each function. The function registration section 402 stores a name pointer (NamePtr) 402A, attribute pointer (AttrPtr) 402B, and object pointer (ObjPtr) 402C for each registered function. The name pointer 402A and attribute pointer 402B specify corresponding locations in the function name section 404 and function attribute section 406, respectively.

The object pointer 402C in the function registration section 402 specifies the start address of the object code of the corresponding function in the object code section 408. In the example shown in FIG. 4, the object code section 408 includes an area 408A containing the object code of the high speed function, FunctionH, and an area 408B containing the object code of the low speed function, FunctionL.

The registering operation performed by the compiler 204 to generate the structure shown in FIG. 4 is described next using the source code shown in FIG. 3 (A) as an example. The compiler 204 analyzes the first pragma directive "#pragma (HIGH_SPEED, FunctionH)" and registers FunctionH as a first function "Function#1" in the function registration section 402. It also registers the function name "FunctionH", its attributes (including high speed attribute, code size), and object code in the function name section 404, function attribute section 406, and object code section 408A, respectively, and sets the name pointer 402A to the function name section 404, attribute pointer 402B to the function attribute section 406, and object pointer 402C to the object code section 408A, in the function registration section 402. The compiler 204 performs the same registering operation for the second pragma directive "#pragma (LOW_SPEED, FunctionL)". While the functions containing arguments arg1, arg2, . . . in FIG. 3 are defined as a void type which does not return any value, other data types may also be used.

The linker 206 which collects the object codes in the same blocks as much as possible based on the table structure created by the compiler 204 in FIG. 4 is described next. The linker groups the functions registered in the object code section 408 in FIG. 4 by operating speed. In the example shown in FIG. 5, the linker collects the high speed function code 1 (FunctionH1) in the object code 1 and the high speed function code 2 (FunctionH2) in the object code 2, as the high speed function group 502; puts the medium speed function code 1 (FunctionM1) in the object code 2 into the medium speed function group 504; and collects the low speed function code 1 (FunctionL1) in the object code 1 and the low speed function code 2 (FunctionL2) in the object code 2, as the low speed function group 506. In this way, by grouping the generated object codes depending on the modules having the same operating speeds, the linker avoids fragmentation of execution address ranges segmented for the respective operating speeds. The linker then creates a file header as shown in FIG. 6 based on such group data.

Figure 6:
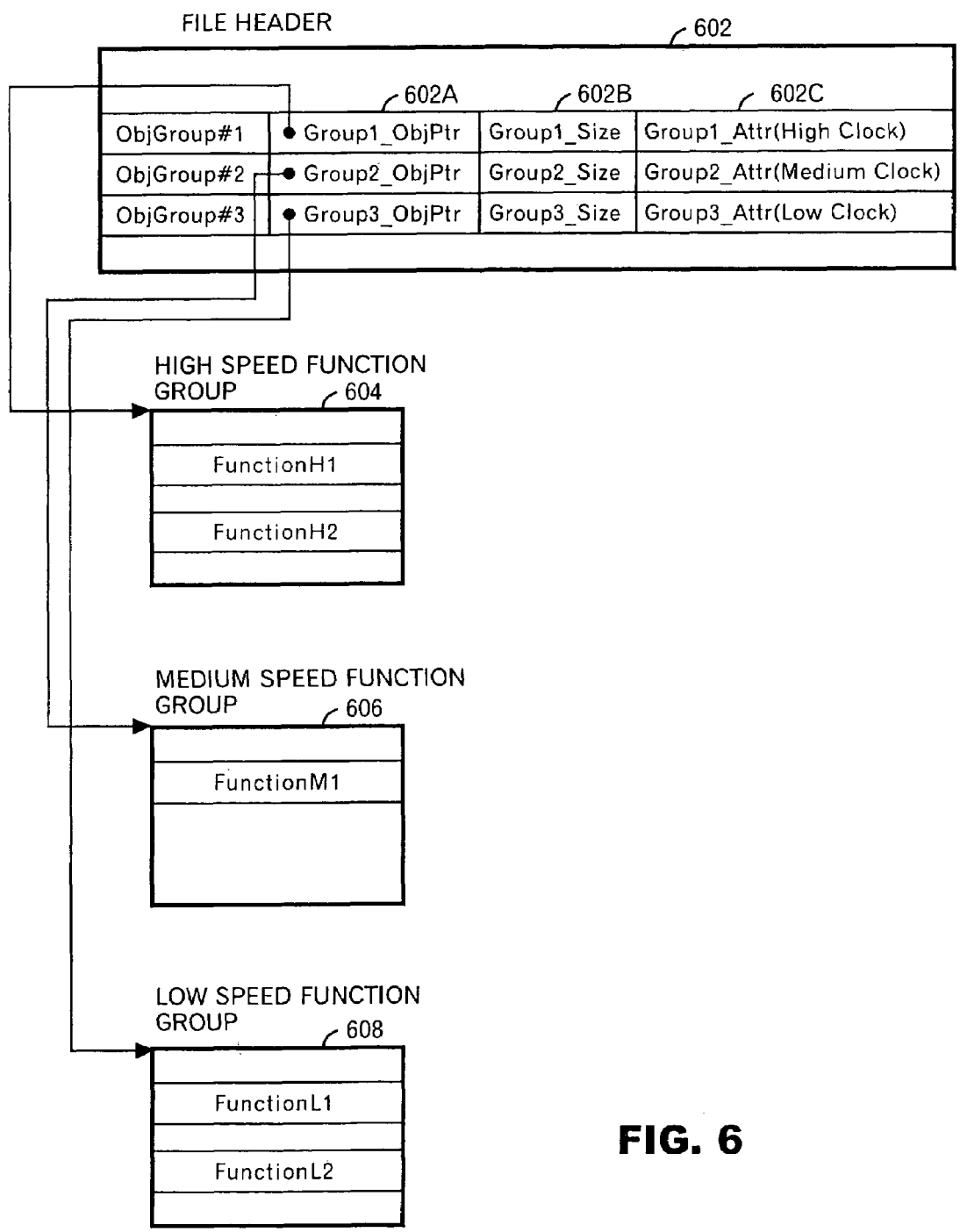
FIG. 6 shows an exemplary file header created by the linker.

The file header 602 has one entry per group as shown in FIG. 6. Each entry contains an object pointer 602A to a corresponding function group, group size data 602B, and clock speed data 602C (high, medium, or low). The group object pointer 602A specifies the start address of the high speed function group 604, medium speed function group 606, or low speed function group 608.

After the linker 206 creates the file header, the OS management program 208 reads the smallest execution module and its clock speed data from the file header, reserves an area for loading the module in order to obtain the module address so that the module is executed at the specified operating speed, and stores the clock speed data in the clock speed data storage corresponding to that address area. The operation of the OS management program 208 is described next using the virtual address conversion mechanism shown in FIG. 7 as an example.

A known virtual address conversion mechanism is shown in the top half of FIG. 7 which converts a virtual (logical) address 706 to a physical address 708 using a page directory (or segment table) 702 and a page table 704. The virtual address 706 consists of a page directory number D, a page table-number T, and an offset. The page directory number D is added to a base address stored in a page directory base address register (PDBR) 710 to select a specific page directory entry (PDE). The selected PDE is used as a base address of the page table 704 to which the page table number T is added to select a specific page table entry PTE. The PTE contains a frame (page address) which is concatenated with the offset in the virtual address 706 to form the physical address 708.

The bottom half of FIG. 7 shows the improvement of this virtual address conversion mechanism according to the present invention. Specifically, control bits indicating the clock speed data are added to each entry of the page table 704. In the example shown in FIG. 7, there are two control bits where "11", "10", and "01" represent high, medium, and low speed operations, respectively.

The OS management program 208 reads the smallest execution modules and corresponding clock speed data from the file header created by the linker 206, allocates execution modules having the same operating speed to a specific page area in the physical address map 712, and sets the clock speed control bits in the page table entry corresponding to this page area according to the clock speed data read from the file header. In the example shown in FIG. 7, the OS management program 208 allocates the high speed functions "FunctionH1" and "FunctionH2" to the first page area 712A, allocates the medium speed function "FunctionM1" to the second page area 712B, and allocates the low speed functions "FunctionL1" and "FunctionL2" to the third page area 712C. The OS management program 208 also sets the clock speed control bits in the page table entries for the page areas 712A, 712B, and 712C to "11", "10", and "01", respectively. Thus, the first page area 712A is defined as a high speed clock page area, the second page area 712B as a medium speed clock page area, and the third page area 712C as a low speed clock page area.

Figure 8:
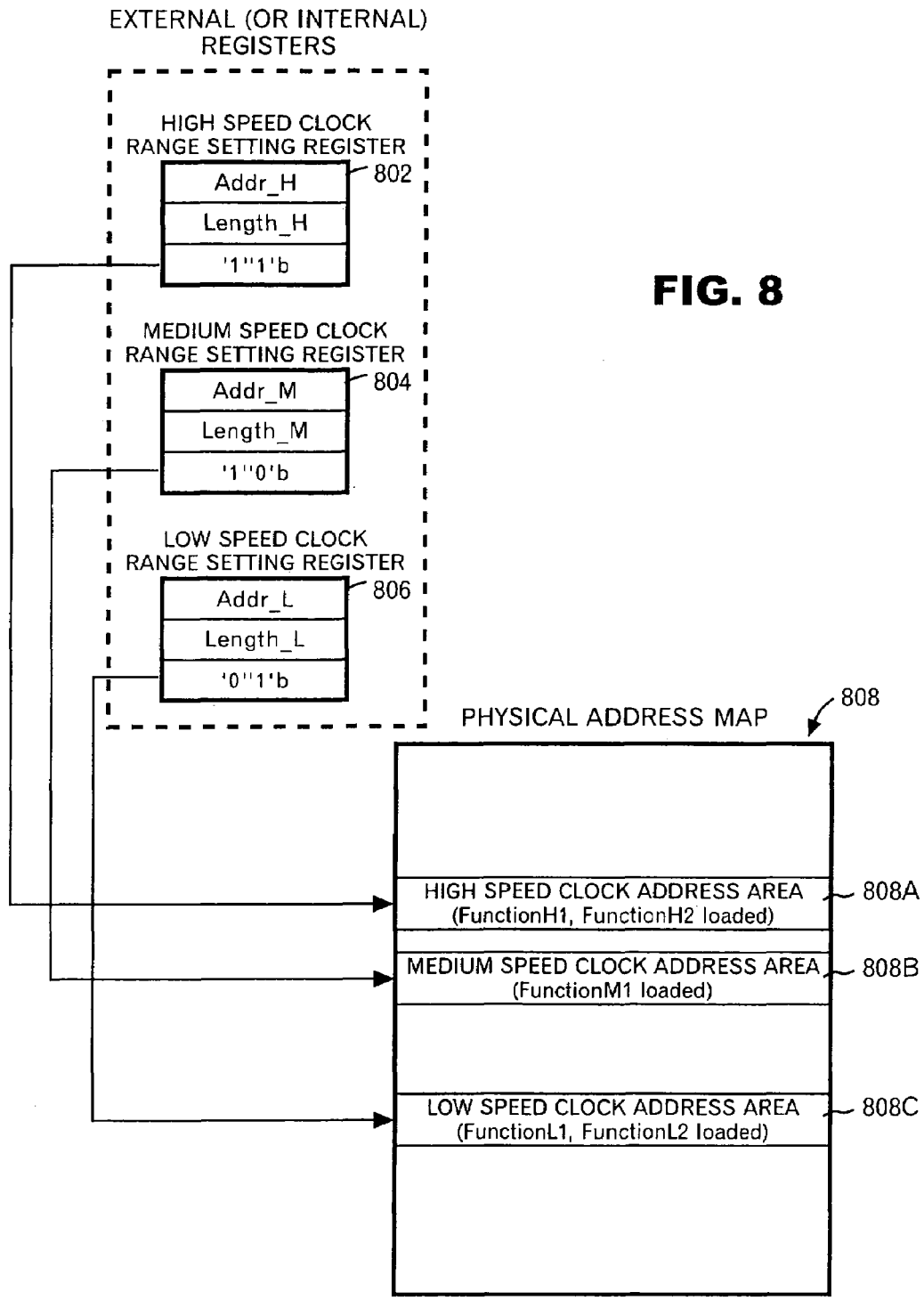
FIG. 8 is a block diagram showing an exemplary register configuration for enabling the operating speed control in a processor that does not have a virtual address conversion mechanism.

If the processor does not have a virtual address conversion mechanism such as the one shown in FIG. 7, range registers 802,804, and 806 for storing plural execution address ranges and corresponding clock speed control bits may be provided as external I/O registers or internal processor registers as shown in FIG. 8. The high speed clock range register 802 stores the start address "Addr_H" and length "Length_H" of the address area 808A in the physical address map 808 where the high speed functions are loaded, and the control bits "11". The medium speed clock range register 804 stores the start address "Addr_M" and length "Length_M" of the address area 808B in the physical address map 808 where the medium speed functions are loaded, and the control bits "10". The low speed clock range register 806 stores the start address "Addr_L" and length "Length_L" of the address area 808C in the physical address map 808 where the low speed functions are loaded, and the control bits "01". Note that if the registers 802,804, and 806 are fixed as high, medium, and low speed registers, respectively, the control bits are not necessary, but if the roles of the registers are changed dynamically, then the control bits are required.

The OS management program 208 may be simplified to take the form of firmware that integrates a function of the OS management program 208 and a function of the executable program part, and can directly reference the address labels of executable codes. In that case, the OS management program function of the firmware may store the control data in the clock speed data storage (control bits) shown in FIG. 7 or FIG. 8 by the direct reference to the address labels separating the high, medium, and low speed operation codes. Since the executable program does not require the header data in this case, the attribute management function for the clock speed may be omitted from the compiler 204 and linker 206.

When the OS management program 208 finishes loading the executable file and setting the clock speed data, the program execution manager 210 reads the clock speed control bits corresponding to the address of the code to be executed in order to execute the code in the loaded executable file at the specified operating speed, supplies the clock control data to the clock controller 212, and then executes the code at the operating speed adjusted by the clock controller 212.

Figure 9:
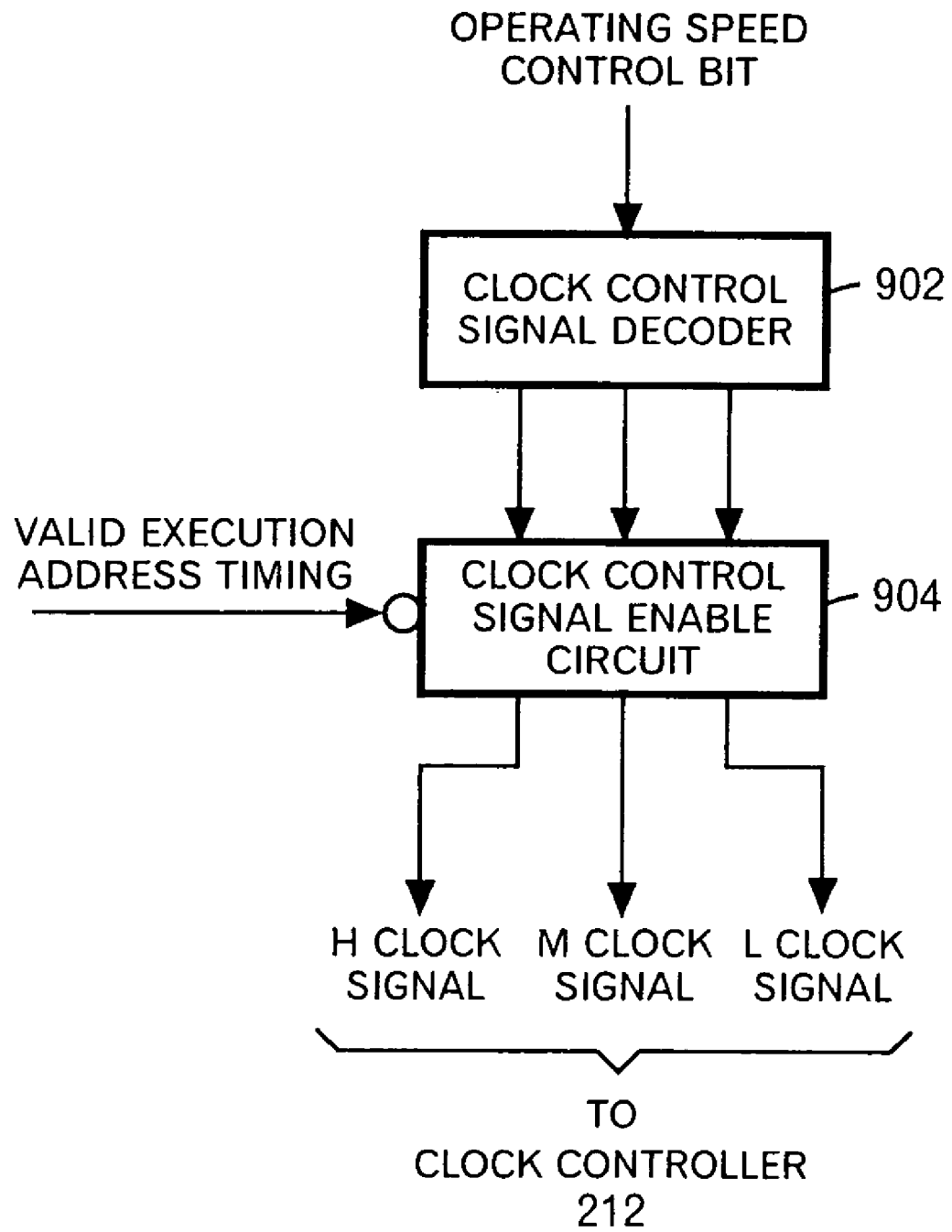
FIG. 9 is a block diagram showing an exemplary circuit for decoding operating speed control bits and generating a selected clock signal.

An example of a circuit for generating the clock control signals supplied to the clock controller 212 is shown in FIG. 9. The clock speed control bits (two bits in this preferred embodiment) read from the page table 704 in FIG. 7 or one of the range registers 802 to 806 in FIG. 8 are input to a clock control signal decoder 902. The decoder 902 decodes the control bits and activates one of the three output lines accordingly. The output lines correspond to the high, medium, and low speed clocks, respectively. In response to the output signal from the decoder 902 and a valid execution address timing signal, a clock control signal enable circuit 904 outputs an appropriate high speed (H), medium speed (M), or low speed (L) clock signal. The valid execution address timing signal indicates when the address of the code executed by the processor 102 is valid on an address bus (not shown).

Figure 10:
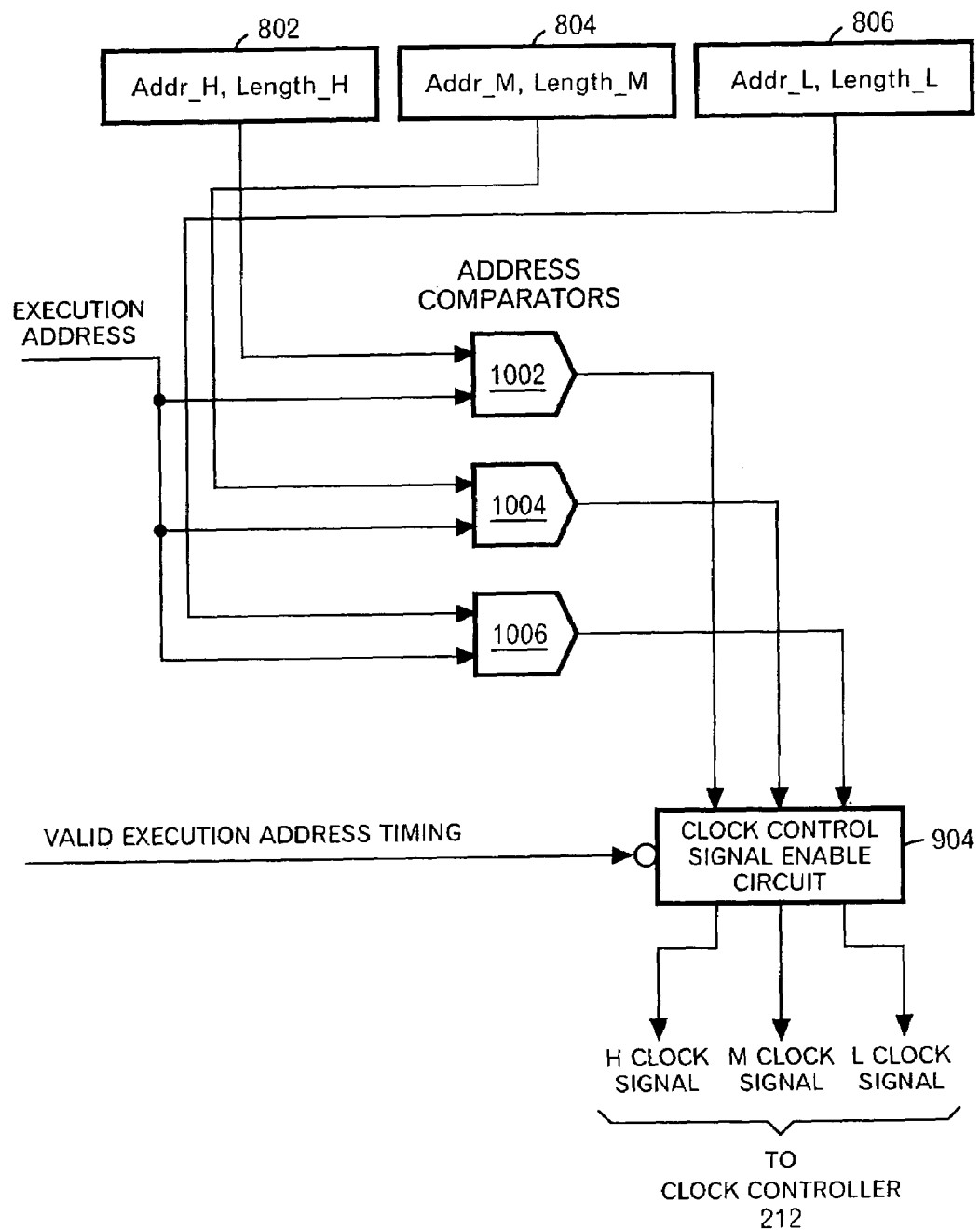
FIG. 10 is a block diagram showing address comparison for clock control in a processor that does not have a virtual address conversion mechanism.

If the processor 102 has a virtual address conversion mechanism, the clock speed control bits contained in the page table entry specified by the virtual address can be supplied to the decoder 902, but if the processor does not have a virtual address conversion mechanism, address comparison such as shown in FIG. 10 is necessary. In FIG. 10, the address of the code to be executed is supplied to the first inputs of three comparators 1002, 1004, and 1006 constituting an address comparator. The second input of the comparator 1002 receives the start address "Addr_H" and length "Length_H" indicating the address range of the high speed clock address area 808A from the range register 802 shown in FIG. 8. The second input of the comparator 1004 receives the start address "Addr_M" and length "Length_M" indicating the address range of the medium speed clock address area 808B from the range register 804. The second input of the comparator 1006 receives the start address "Addr_L" and length "Length_L" indicating the address range of the low speed clock address area 808C from the range register 806. If the execution address resides in one of these address ranges, the comparator corresponding to that address range activates a corresponding input of the clock control signal enable circuit 904. In the example shown in FIG. 10, the control bits are not stored in the registers 802 to 806. As noted above, however, if the role of each register is not fixed, the control bits indicating the clock speed are needed in which the control bits stored in a selected register are supplied to the clock control signal decoder 902 depending on the output from the comparators 1002 to 1006. While the decoder 902 is not shown in FIG. 10, it is required when the control bits are used.

Figure 11:
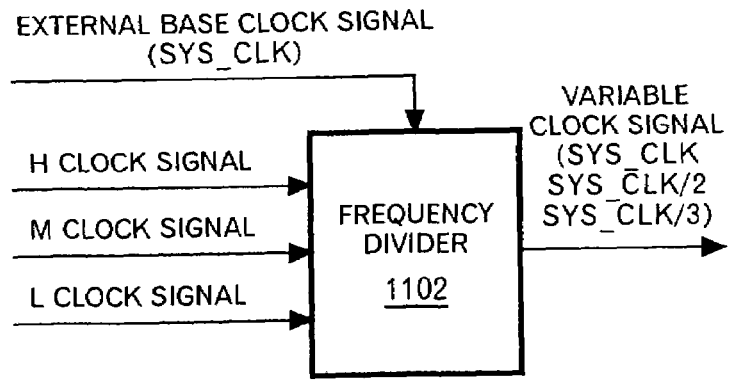
FIG. 11 is a block diagram showing an exemplary circuit for generating a variable clock signal.

The clock controller 212 receives the output from the clock control signal enable circuit 904 and supplies a corresponding variable clock signal, which may be constituted by a frequency divider 1102 as shown in FIG. 11. The frequency divider 1102 outputs an external base clock signal supplied from an oscillator (not shown) as a system clock as it is when the clock control signal enable circuit 904 outputs the H clock signal, or outputs the system clock divided by two when the M clock signal is received, or outputs the system clock divided by three when the L clock signal is received. Note that these frequency division ratios 1, ½, and ⅓ are presented for the illustration purpose only, and other ratios may also be used.

Figure 12:
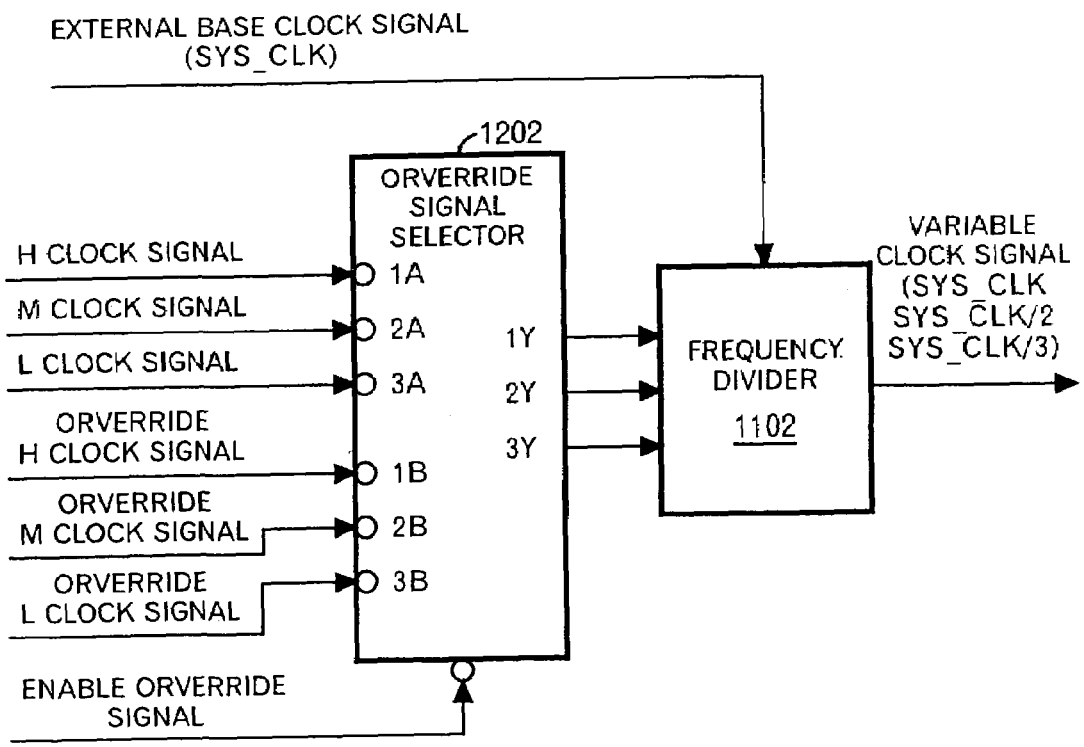
FIG. 12 is a block diagram showing an exemplary circuit for supporting an override clock instruction in the variable clock signal generating circuit shown in FIG. 11.

FIG. 11 shows an example in which the clock speed is not changed (overridden) by a processor instruction. If an override instruction and an instruction for canceling the override are inserted in the source code as shown in FIG. 3(B), however, an additional circuit is required to support these instructions. An example of such circuit is shown in FIG. 12. The added circuit is an override signal selector 1202. This override signal selector 1202 has input terminals 1B, 2B, and 3B receiving clock signals for overriding, in addition to input terminals 1A, 2A, and 3A receiving the same clock signals as those shown in FIG. 11. When an override instruction is detected and an enable override signal is active, an override clock signal specified by the override instruction is output from an output terminal 1Y, 2Y, or 3Y to the frequency divider 1102 instead of the clock signals H, M, L.

In the drawings and specifications there has been set forth a preferred embodiment of the invention and, although specific terms are used, the description thus given uses terminology in a generic and descriptive sense only and not for purposes of limitation.

The invention claimed is:

1. A method for controlling operating speed of a processor which allows said operating speed to be varied depending on an execution module, comprising the steps of:
   registering execution modules in association with operating speed attribute data by analyzing code containing operating speed of each of the execution modules as attribute data;
   grouping the registered execution modules by operating speed based on the associated operating speed attribute data, and creating a file header containing attributes of each group;
   upon loading an executable file containing said file header into memory at the time of execution, associating operating speed attribute data with an address range of said loading for each execution module in said executable file and storing operating speed data indicated by said operating speed attribute data in a predetermined operating speed data storage provided in a conversion table of a virtual address conversion mechanism; and
   controlling the operating speed of the processor executing an execution module according to the operating speed attribute data associated with the address of said execution module when said module is executed.

2. A method for controlling operating speed of a processor as described in claim 1, wherein said controlling step reads corresponding operating speed data from said operating speed data storage to control the operating speed of said processor.

3. A method for controlling operating speed of a processor as described in claim 1, wherein said associating step includes a step of storing data indicating said address range in registers corresponding to the respective operating speeds.

4. A method for controlling operating speed of a processor as described in claim 3, wherein said controlling step includes a step of comparing the address of said execution module with the data stored in said registers to provide an operating speed corresponding to the address range containing said address.

5. An apparatus for controlling operating speed of a processor which allows said operating speed to be varied depending on an execution module, comprising:
  means for registering execution modules in association with operating speed attribute data by analyzing code containing operating speed of each of the execution modules as attribute data;
  means for grouping the registered execution modules by operating speed based on the associated operating speed attribute data, and creating a file header containing attributes of each group;
  means for, upon loading an executable file containing said file header into memory at the time of execution, associating operating speed attribute data with an address range of said loading for each execution module in said executable file, said associating means including an operating speed data storage provided in a conversion table of a virtual address conversion mechanism for storing operating speed data indicated by said operating speed attribute data; and
  means for controlling the operating speed of the processor executing an execution module according to the operating speed attribute data associated with the address of said execution module when said module is executed.

6. An apparatus for controlling operating speed of a processor as described in claim 5, wherein said controlling means reads corresponding operating speed data from said operating speed data storage to control the operating speed of said processor.

7. An apparatus for controlling operating speed of a processor as described in claim 5, wherein said associating means includes plural registers for storing data indicating said address range correspondingly to the respective operating speeds.

8. An apparatus for controlling operating speed of a processor as described in claim 7, wherein said controlling means includes means for comparing the of said execution module with the data stored in said registers to provide an operating speed corresponding to the address range containing said address.

* * * * *